March 10, 1925.
C. W. GREENE ET AL
1,529,248
AUTOMATIC CLUTCH
Filed March 26, 1924
2 Sheets-Sheet 1
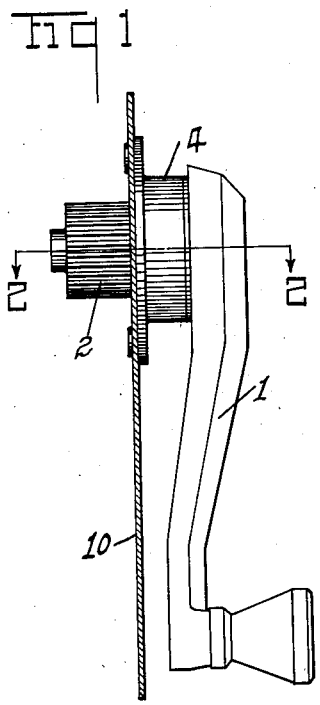
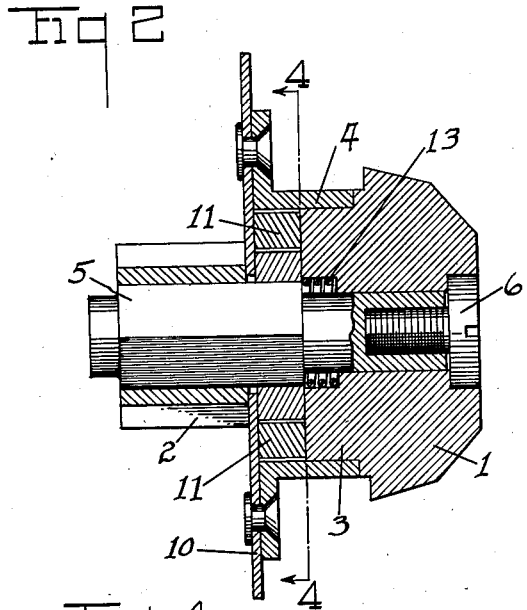
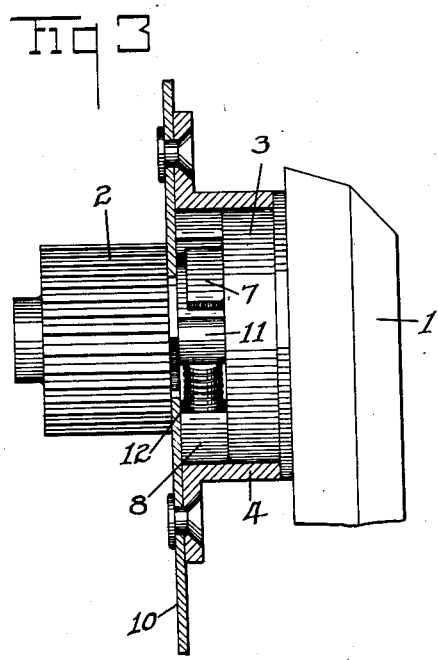
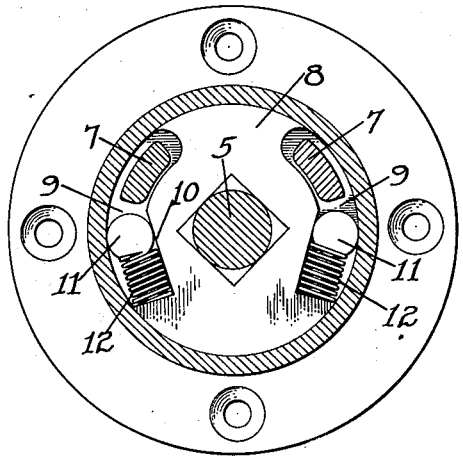

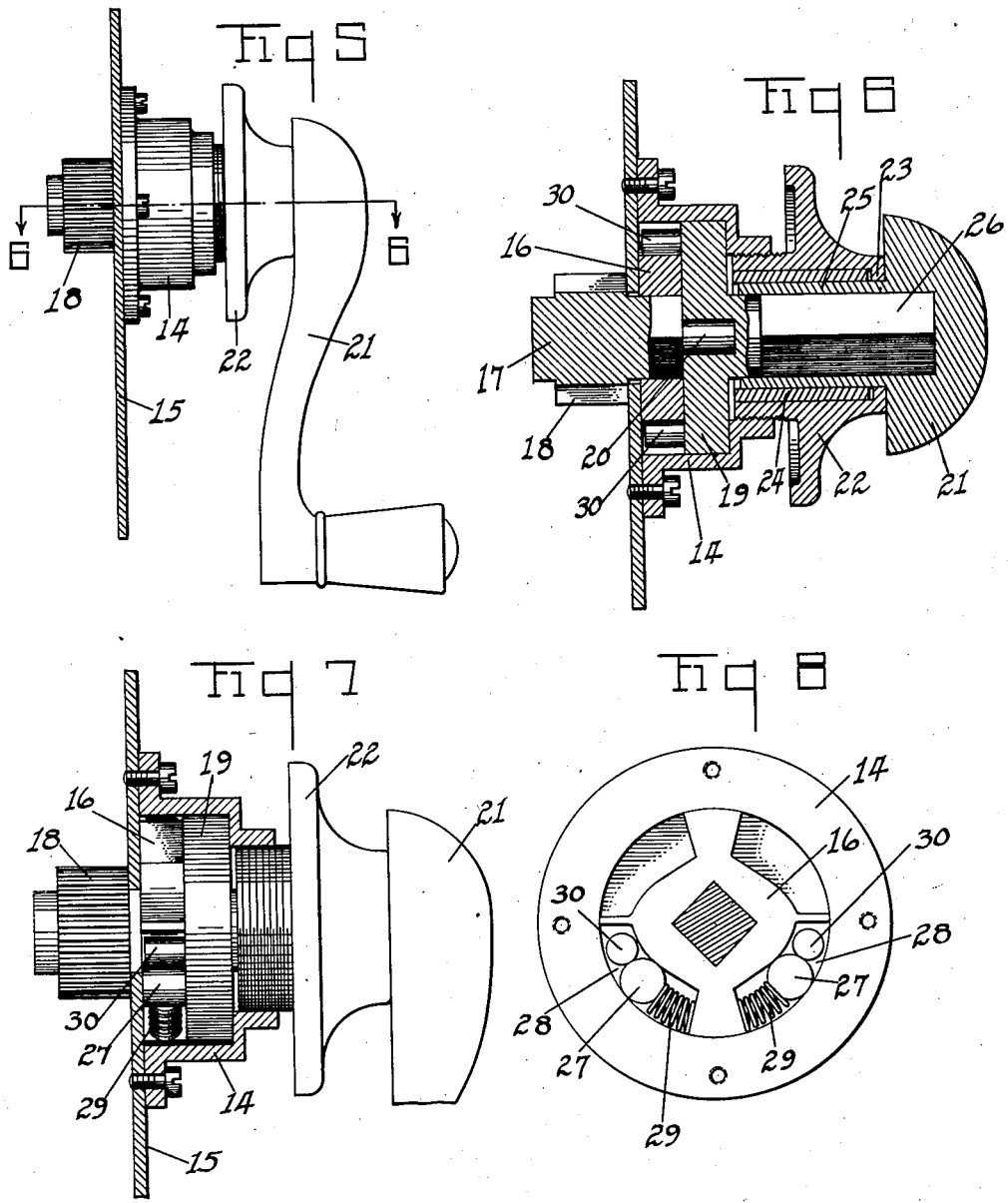

Patented Mar. 10, 1925.

1,529,248

UNITED STATES PATENT OFFICE.

CHARLES W. GREENE AND GEORGE W. HOUSDORFER, OF TOLEDO, OHIO, ASSIGNORS TO THE W. G. NAGEL ELECTRIC COMPANY, OF TOLEDO, OHIO, A CORPORATION OF OHIO.

AUTOMATIC CLUTCH.

Application filed March 26, 1924. Serial No. 701,991.

*To all whom it may concern:*

Be it known that we, CHARLES W. GREENE and GEORGE W. HOUSDORFER, citizens of the United States, and residents of Toledo, in the county of Lucas and State of Ohio, have invented a new and useful Automatic Clutch, which invention is fully set forth in the following specification.

Our invention has for its object to produce an effective and yet simple automatic clutch, wherein an operative member that is used to actuate a device will automatically release the clutch, permit movement of the device, and the clutch will automatically engage when the operative member ceases to actuate the device. The invention may be applied to a number of uses and may be contained in a number of constructions that vary in their form. By reason of the simplicity and compactness of the structures containing the invention, the invention is particularly applicable to window raising and lowering devices. It is of particular value when used in connection with raising devices for windows of automobiles and other vehicles where the windows are subject to constant jarring, which tends to lower the windows in their frames.

To illustrate a practical application of the invention, we have selected one or two structures containing the invention and shall describe them hereinafter. The structures selected are particularly adapted for locking automobile windows in the positions to which they may be moved by a crank operated window raising and lowering device. The structures selected as examples are shown in the accompanying drawings.

Figure 1 illustrates a side view of a clutch mechanism embodying our invention. Figure 2 illustrates a sectional view taken on the line 2—2 indicated in Fig. 1. Figure 3 illustrates a side view of a part of the clutch mechanism. Figure 4 is a sectional view taken on the line 4—4 indicated in Fig. 2. Figure 5 illustrates a modified form of the structure shown in Figs. 1 to 4 inclusive. Figure 6 is a sectional view taken on the line 6—6 indicated in Fig. 5. Figure 7 is a side view of a part of the clutch mechanism. Figure 8 is an end view of a part of the clutch mechanism shown in Figs. 5 to 7 inclusive.

The actuating members for operating automobile window raising and lowering devices are usually cranks that are mechanically connected to the lifting mechanism. In the construction shown in Figs. 1 to 4 inclusive, 1 is a crank that is used to operate any member that will actuate the window raising and lowering mechanism. For purposes of illustration, the crank 1 is used for rotating the gear wheel 2. The movement of the gear wheel 2 may be translated through any suitable mechanism to the window to raise and lower the window. The hub 3 of the crank 1 is rotatably secured in a collar 4 by means of the shaft 5 which is secured to the gear wheel 2. The crank 1 is rotatably connected to the shaft 5 by means of the screw 6. It is mechanically connected to the shaft 5 so as to drive the gear wheel 2 by means of two inwardly projecting fingers 7 that operate a disc 8 which is keyed to the shaft 5. The fingers 7 are located in recesses 9 formed in the disc 8. The disc 8 is located within the collar 4 and so as to be confined between the supporting wall 10 and the hub 3 of the crank. The recesses 9 of the disc 8 form lateral surfaces that are opposed to the inner cylindrical surface of the collar 4. A portion of the surface of the disc 8 is substantially straight or eccentric to the opposed cylindrical surface of the collar 4 in each case. Between this portion 10 of the surface of the recess and the cylindrical surface is located a short cylindrical member 11 which is spring pressed by a spring 12 located intermediate the cylindrical member 11 and one end of the recess. The spring 12 operates to press the cylindrical member 11 in a general tangential direction that tends to wedge the cylindrical member 11 between the opposing surfaces. Relative to the direction of the rotation of the shaft 5, one of the cylindrical members 11 is pressed by the spring associated with it in a clockwise direction while the other cylindrical member 11 is moved in a direction counter-clockwise, and so that when pressure is imparted to the shaft 5 to rotate it in either direction, the wedging action of one or the other of the members 11 will be increased to cause the said member to bind between the opposing surfaces, one, of the disc 8, and the other, the inner cylindrical surface of the collar, and thus any tendency of movement on the part of the window lifting mechanism as transmitted to the crank, will be opposed by the engagement induced between the cylindrical members 11 and the opposing surfaces. Thus, the window will be located in the position to which it may be raised so that it can be neither raised nor lowered by any directly applied force.

In order to operate the window raising and lowering mechanism, the crank 1 is rotated either to the right or to the left. When it is turned in either direction one of the fingers 7 engage an end of a recess 9 while the other finger 7 engages the cylindrical member 11 of the other recess and so as to push the cylindrical member 11 against the tension of the spring 12, away from the point where it will wedge between the opposing surfaces of the recess and of the collar. Since the direction of the force thus supplied by the crank 1 to the disc 8 to cause rotation of the disc 8, is in a direction such as to continuously draw the eccentrically opposing surface of the recess of the disc 8 from the member whose associated spring is not depressed, wedging action of the member as between the opposing surfaces of the recess and of the collar will be avoided, and consequently the crank 1 will not only be positively connected to the raising and lowering mechanism of the window but also will be absolutely free to actuate the mechanism. The mechanism thus provides free transmission of the power applied through the crank to the actuating mechanism, but there can be no transmission of movement from the window to the crank since any such movement will be prevented by reason of the clutch engagement between one or the other of the cylindrical members 11 and the opposing surfaces that it binds.

Since there is some play in the rotation of the crank 1 about the shaft 5, any movement if desired may be frictionally resisted in a slight degree by means of a spring 13 which is located in a recess of the hub 3 of the crank and between the inner end of the recess and the disc 8. The spring 13 also operates to prevent any rattling that might be caused by any looseness of connection of the parts of the structure.

In Figs. 5 to 8 inclusive is shown a modification of the structure illustrated in the other figures. A shell 14 is secured to a suitable supporting wall 15 or part of a structure, and a recessed member 16 is located in the shell 14 and is keyed to the shaft 17 to which is connected the gear wheel 18. If desired, the gear wheel may be formed integral with the shaft. A disc 19 is located in the shell 14 and is bored in the center to receive a pin 20 that centers the shaft 17 and the disc 19 and maintains them coaxial relative to each other. Thus the shaft 17 may be connected to the mechanism by its insertion through the member 16 and the pin 20 and into the disc 19. The crank 21 is rotatably connected to a flanged member 22. The flanged member 22 has an inturned edge portion 23 which is located between the body of the crank 21 and a sleeve 24 that is forced on to the hub 25 of the crank, whereby the crank may be freely rotated relative to the flanged member 22. The disc 19 is provided with a projection 26 having a square cross section, and the hub 25 of the crank is provided with a recess that fits the projecting part 26 so that when it is desired to connect the crank 21 to the disc 19, the flanged member 22 is threaded into the shell 14. The crank 21 will thus be keyed to the disc 19 and movement of the crank 21 will cause rotation of the disc 19.

Spring pressed cylindrical members 27 are located in two of its recesses 28. The surfaces of the recesses 28 are formed eccentric to the cylindrical inner surface of the shell 14, and the springs 29 that press against the cylindrical members 27 tend to wedge the cylindrical members 27 between the opposing surfaces. The disc 19 is provided with pins or fingers 30 that extend into the recesses 28 and so as to engage one with the member 16 and the other with a cylindrical member 27, according to the direction in which the disc 19 is rotated by the operation of the crank 21, whereby the member 16 will be rotated and the cylindrical member 27, that would oppose such rotation by its wedging action as between the opposing surfaces, is moved against the tension of its associated spring so as to prevent such opposition. Thus the crank may freely rotate the member 16 in either direction. Rotation of the disc 19 that may be imparted by the window operating through the window lifting mechanism, however, is prevented by the wedging action of the cylindrical members 27, one or the other of which will tightly wedge and engage the stationary shell 14 according to the direction that the force is applied, that might otherwise cause rotation.

By our invention is thus provided an exceedingly simple and efficient clutch that will permit the operation of a device by a rotative actuating member but will be held locked from movement by clutch engagement with a stationary member, which will lock the device in any position in which it may be placed by the actuating member.

I claim:

1. In a clutch, a rotative actuating member, a stationary member having a cylindrical surface, a rotatable member located within the stationary member and having recesses, the recesses having surfaces eccentric to the cylindrical surface of the stationary member, a pair of spring pressed cylindrical member, members located in the recesses and between the surfaces of the rotatable member and the said cylindrical surface of the stationary member and frictionally engaging the said surfaces, the actuating member having a pair of fingers located in the recesses for engaging an end of either of the recesses and the spring pressed cylindrical member located in the other recess.

2. In a clutch, a rotative actuating member, a stationary member having a cylindrical surface, a rotatable member located within the stationary member and having recesses, the recesses having surfaces eccentric to the cylindrical surface of the stationary member, a pair of wedge members and a pair of springs located in the recesses and between the surfaces eccentric to the cylindrical surface of the stationary member and the said cylindrical surface, a pair of spring members abutting the wedge members and the rotatable member at the ends of the recesses, the rotative actuating member having fingers located in the recesses for engaging the rotatable member at one end of one recess and engaging a wedge member in the other recess and transmitting its pressure on the wedge member through the wedge member and its associated spring to the rotatable member, by the pressure of the spring against the end of the said other recess.

In testimony whereof, we have hereunto signed our names to this specification.

CHARLES W. GREENE.
GEORGE W. HOUSDORFER.